(12) United States Patent
Kirkwood

(10) Patent No.: US 10,816,957 B2
(45) Date of Patent: Oct. 27, 2020

(54) CAD INTEGRATION THROUGH VIRTUAL PERSISTENT IDENTIFIERS AND DESIGN CHANGE RECOGNITION

(71) Applicant: Robert Kirkwood, Nashua, NH (US)

(72) Inventor: Robert Kirkwood, Nashua, NH (US)

(*) Notice: Subject to any disclaimer, the term of this patent is extended or adjusted under 35 U.S.C. 154(b) by 70 days.

(21) Appl. No.: 15/456,475

(22) Filed: Mar. 10, 2017

(65) Prior Publication Data
US 2018/0259937 A1  Sep. 13, 2018

(51) Int. Cl.
*G05B 19/4099* (2006.01)
*G05B 19/042* (2006.01)

(52) U.S. Cl.
CPC ...... *G05B 19/4099* (2013.01); *G05B 19/0426* (2013.01); *G05B 2219/35012* (2013.01); *G05B 2219/35085* (2013.01); *G05B 2219/35134* (2013.01)

(58) Field of Classification Search
CPC ...... G06F 17/50–5095; G05B 19/4097; G05B 19/4099; G06T 17/00–30; G06T 19/00–20
See application file for complete search history.

(56) References Cited

U.S. PATENT DOCUMENTS

| | | | | |
|---|---|---|---|---|
| 5,819,062 A * | 10/1998 | Srikantappa | ............ | G06F 30/00 716/102 |
| 6,614,430 B1 * | 9/2003 | Rappoport | ............ | G06F 30/17 345/420 |
| 6,686,914 B2 * | 2/2004 | Keener | ............ | G06F 16/116 345/420 |
| 7,492,364 B2 * | 2/2009 | Devarajan | ............ | G06T 17/00 345/419 |
| 2005/0046624 A1 * | 3/2005 | Jayaram | ............ | G05T 17/00 345/419 |
| 2011/0131016 A1 * | 6/2011 | Stolper | ............ | G06F 17/30259 703/1 |
| 2011/0153052 A1 * | 6/2011 | Pettibone | ............ | G05B 19/4097 700/98 |
| 2015/0317413 A1 * | 11/2015 | Georgescu | ............ | G06T 17/20 703/1 |

* cited by examiner

*Primary Examiner* — Daniel F Hajnik

(57) ABSTRACT

Disclosed is a method of integrating changes to a computer aided manufacturing software application file for a manufactured component comprising the steps of: obtaining a first computer aided design file for the manufactured component; displaying a first solid model of the manufactured component; obtaining a second computer aided design file for a revised version; displaying a second solid model of the revised version of the manufactured component; and matching at least one face on the second solid model to at least one face on the first solid model.

1 Claim, 9 Drawing Sheets

US 10,816,957 B2

CAD INTEGRATION THROUGH VIRTUAL PERSISTENT IDENTIFIERS AND DESIGN CHANGE RECOGNITION

FIELD OF THE INVENTION

This invention relates to a computer-aided design (CAD) software Integration solution which provides for integration with imported CAD models.

BACKGROUND OF THE INVENTION

The current state of the art for CAD software is often unable to provide reliable, automatic, tight integration to CAD files imported from other CAD formats. FIG. 1 shows a typical engineering design workflow 10, as may be followed by a parts manufacturer. An engineer models a manufacturing component using a manufacturer CAD software program 22 to produce an original design CAD file 12 (123-A) for a client, for example. A manufacturer translator 24 is used to convert the original design CAD file 12 into a receiving format CAD file 14 (123-A').

The receiving format CAD file 14 is converted by using a manufacturer NC program 26 to produce an original design CAM file 16 (123-A'.NC) suitable for controlling one or more machining tools to fabricate the manufacturing component. The original design CAM file 16 may be run to produce a solid model of the manufacturing component for quality evaluation.

This model is often modified by engineering, resulting in the need to also update work done in these other engineering applications. Most major CAD platforms already offer some level of integration (i.e., "associativity" or "wave linking") to automatically update partner applications when changes are made. This integration is currently based on format-specific application programming interfaces (APIs) that reference the history and entity identifiers in a feature tree.

If any modifications are required to the design of the manufacturing component, as may be determined from inspection of the solid model, the engineer can make appropriate changes to the original design CAD file 12. The original design CAD file 12 is edited using the manufacturer CAD software program 22 and then converted using the manufacturer NC program 26 to produce an updated design CAM file 18 (123-B'.NC). As understood by one skilled in the relevant art, the names or identifiers given to the unchanged surfaces of the manufacturing component in the updated design CAM file 18 are the same names or identifiers used in the original design CAM file 16 and in the original design CAD file 12.

In addition to the shape and design of the manufacturing component, the manufacturer CAD software program 22 producing the original design CAD file 12 defines a "feature tree" unique to the CAD software application. The feature tree includes information such as: how shapes are defined, materials, tolerances, change history, and the identifiers naming each element of the part. Then, this model is often linked to adjacent models in an assembly and/or used in other engineering software such as simulation (e.g., FEA) or manufacturing (e.g., CAD/CAM).

Sometimes, the design of the manufacturing component is modified by a client using a client CAD software program 32 that is not in the same format as the manufacturer CAD software program 22 used by the parts manufacturer. The client may produce a version of the manufacturing component as defined in a client design CAD file 42 (123-B). A client translator 34 converts the client design CAD file 42 into a client receiving format CAD file 44 (123-B').

The traditional approach breaks down when the client engineers use the client CAD program 32, and the parts manufacturer attempts to use the client receiving format CAD file 44 to fabricate a part. To accomplish this, a suitable translator would be needed to migrate the CAD models between the client format and the parts manufacturer format. The translation process requires analyzing the information in the feature tree of the sending format, and using that to re-build a feature tree in the receiving format. The suitable translator would function to re-assign entity identifiers each time a model is translated, but some design history would be lost in the process. Other applications that depend on those identifiers to integrate to the model will fail to integrate.

In view of this situation, there are some options for engineers who work with models received in other formats: For example, API-based integration allows integration between a specific sending format to a specific receiving format. Due to the number of potential combinations, this is expensive to support and limits software options. Often advance installation of the integration software and/or specific process steps are needed. If either party updates its respective CAD software, the integration process may break down. The engineering work then needs to be manually repeated each time a revised model is imported from a different format.

The CAD/CAM industry has failed to resolve this incompatibility for the last forty five years. Most prior efforts focused on an industry-wide standard or improved translators. Standards such as STEP (Standard for the Exchange of Product Model Data: ISO 10303) move the CAD data, but do not protect integration for multiple applications. Proprietary CAD systems store the CAD data such that only their own applications update when the CAD model changes. What is needed is a more flexible and reliable solution.

DETAILED DESCRIPTION OF THE INVENTION

This invention is a process for enabling elements to provide a better alternative for integration with imported CAD models. The disclosed process is applied after engineering work has been performed based on an original model of a manufactured component, and wherein a subsequent model of the manufactured component has been imported by a client. At that point the resulting design changes can be determined through analysis of the model geometry and used to assign the same identifiers as used on the original model to each unchanged entity on the subsequent model. With stable identifiers on each new imported model, the native integration tools in the receiving CAD format will update any dependent engineering applications.

The disclosed process can be applied after the geometry of the manufactured component has been imported and used by a receiving application. The disclosed process can further be adapted for use with other engineering software applications, such as simulation and assemblies. For example, a receiving engineering team can perform some work based on an imported design of the manufactured component, denoted as Revision A or "revA". The current revA design may include corrected import errors, added notes, design changes, or integration to other applications. A subsequent revision of the revA file, denoted as Revision B, or "revB", is sent by the party that created the file to be imported. The changes that had been made by the receiving party are now based on an outdated file. The disclosed process can be applied to recognize the changes from revA to revB, and apply the changes to the file in which the importing entity has already been working. This approach can be more forgiving and robust than, for example, trying to repeat or transpose the work done on the first imported file onto the new imported file.

Figure 1:
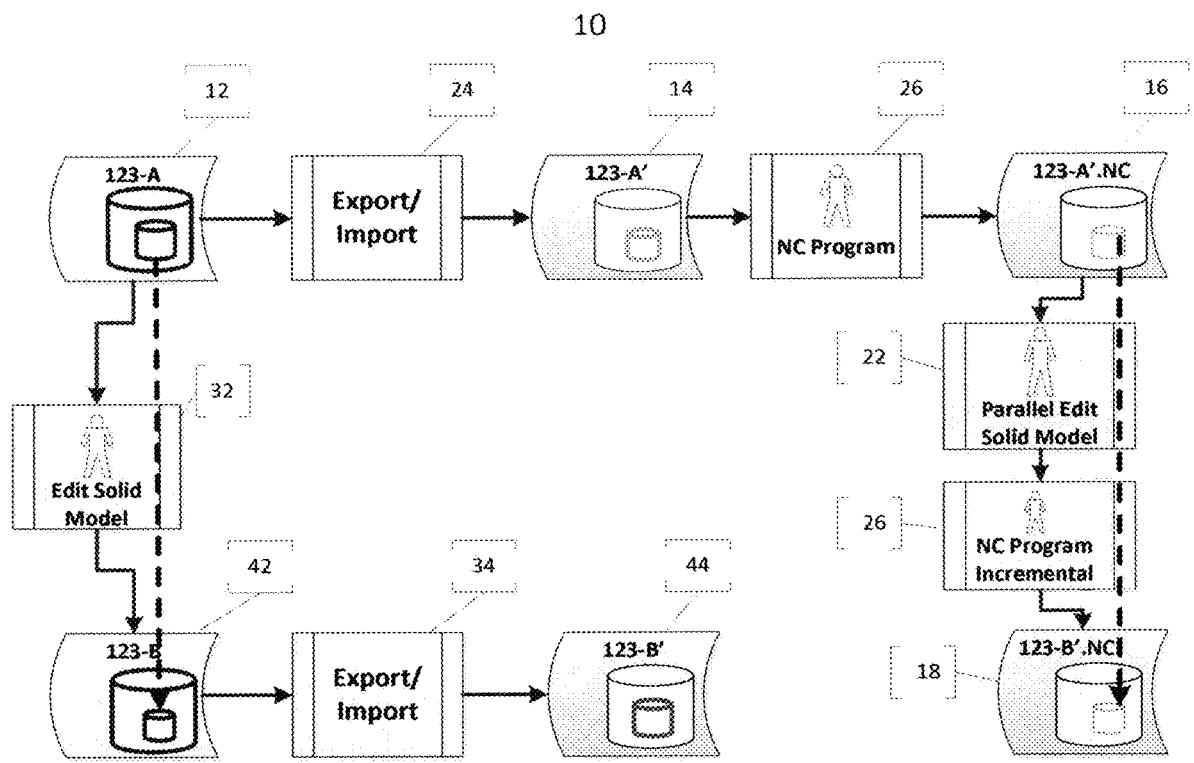
FIG. 1 is an engineering design workflow, in accordance with the present state of the art.
Figure 2:
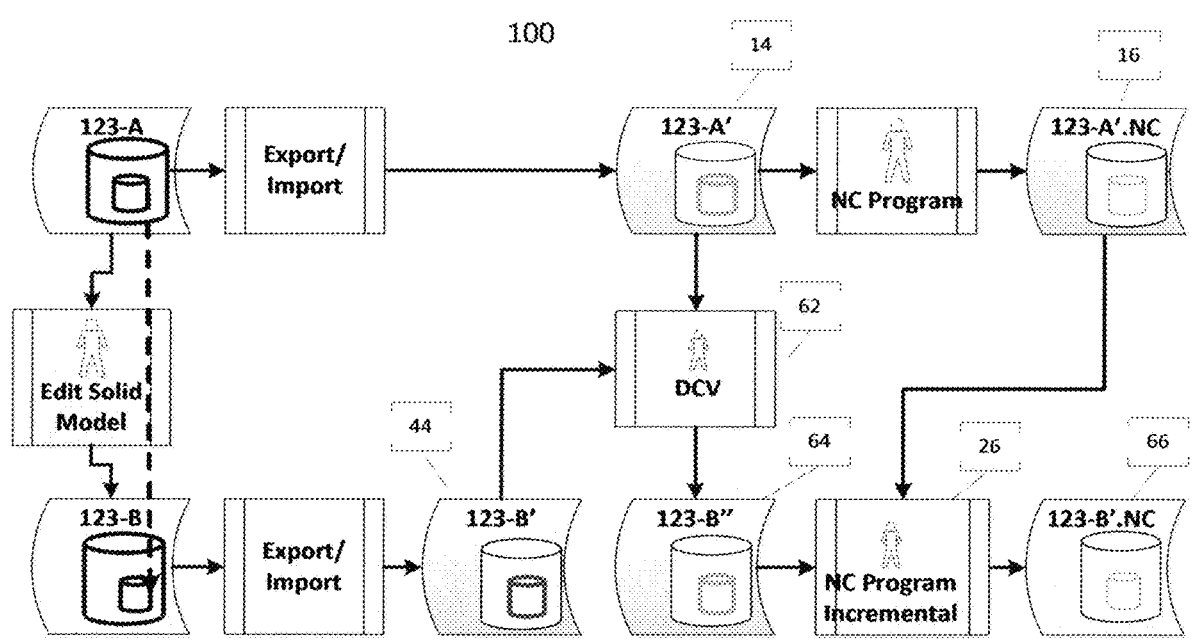
FIG. 2 is an integrated engineering design workflow, in accordance with the present invention.

There is shown in FIG. 2 an integrated engineering design work flow 100, in accordance with the present invention. The parts manufacturer has produced the receiving format CAD file 14, and the client has produced the client receiving format CAD file 44, as described above. To integrate the design attributes of the client receiving format CAD file 44 with the receiving format CAD file 14, the parts manufacturer uses a design change vector (DCV) software program 62, or a similar software application, as described in greater detail below. If the identifiers used in the client receiving format CAD file 44 have been changed from the corresponding identifiers used in the receiving format CAD file 14, the DCV software program 62 functions to change the identifiers in the client receiving format CAD file 44 back to the identifiers used in the receiving format CAD file 14.

The DCV software program 62 outputs an integrated receiving format CAD file 64 which may be converted by the manufacturer NC software program 26 into an integrated design CAM file 66. The manufacturer NC software program 26 may be used to evaluate the original design CAM file 16 in the process of converting the integrated receiving format CAD file 64 into the integrated design CAM file 66. The integrated design CAM file 66 thus includes all manufactured part changes included in the receiving format CAD file 14 and in the client receiving format CAD file 44. It can be appreciated that the DCV software program 62 can also be applied to other engineering software applications, such as simulator software applications and assembly software applications.

In particular, the DCV software program 62 recognizes the design changes present in the client receiving format CAD file 44, the design changes differing from the receiving format CAD file 14. The DCV software program 62 applies virtual persistent identifiers to provide sustained integration. Two solid models are reverse-engineered by geometric or topological comparison to determine what edits were applied to move from a previous version to a current version by comparing component surfaces or faces. This determination process enables the virtual persistent identifiers on various component entities to be stabilized, allowing integration with later versions without relying on pre-existing integration or format-specific meta-data. The geometry of the solid models serves to aid in the determination of the design changes so that the virtual persistent identifiers for the component faces can be corrected.

Persistent identifiers are identifiers on various data in a CAD model that allow other applications to refer to the CAD data. The identifiers persist in that when the CAD model changes, the identifiers continue to refer to the same geometry. Virtual Persistent Identifiers are identifiers assigned to various imported CAD data. These imported identifiers differ from the persistent identifiers in the original CAD model and they generally re-sequence to new values upon importing each new version of the CAD model. These re-sequenced values are not useful to a receiving application for sustained integration. When the re-sequenced identifier values are repaired so that the repaired identifier values present themselves to the receiving application as being persistent, they are referred to as virtually persistent identifiers.

By reverse engineering the edits from the topology and/or geometry, and recognizing engineering changes, the disclosed process is enabled to recognize and consolidate all the edits such that the edits are comprehensively reconciled with design intent, thus assuring that the component face matches are correct. In contrast, a conventional change management process would respond by issuing an engineering change order (ECO) as a separate manually reconciled document or integration based on format-specific APIs.

Figure 3:
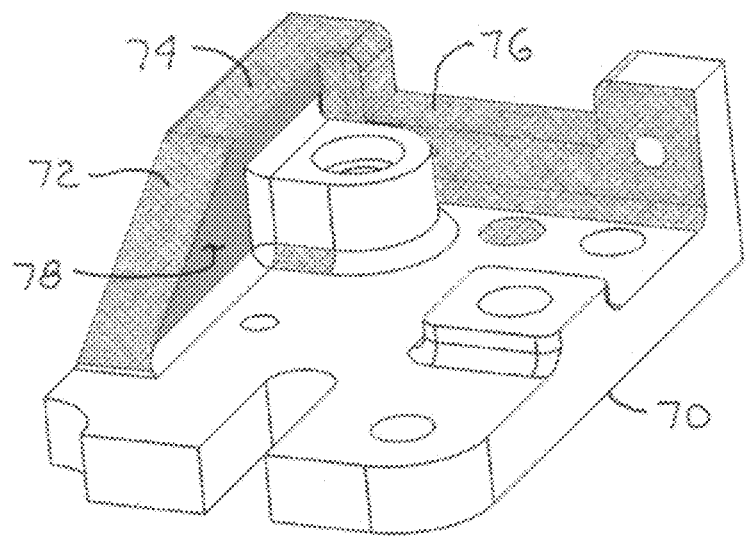
FIG. 3 is an isometric view of a machined component part as originally envisioned by a manufacturer designer.
Figure 4:
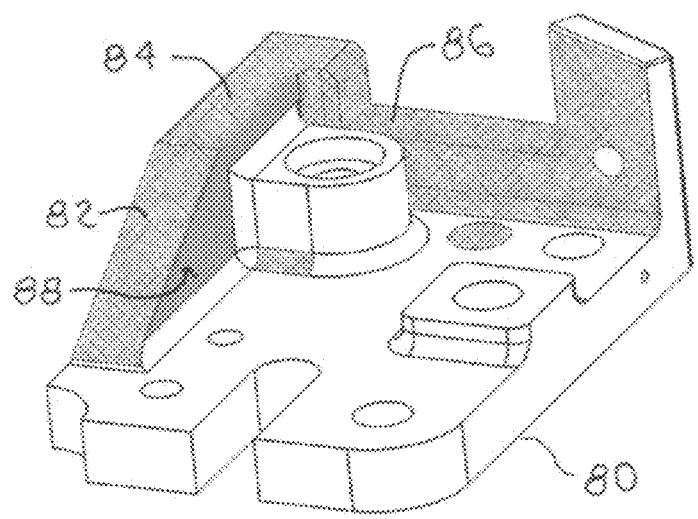
FIG. 4 is an isometric view of a machined component part as modified by a client.
Figure 5:
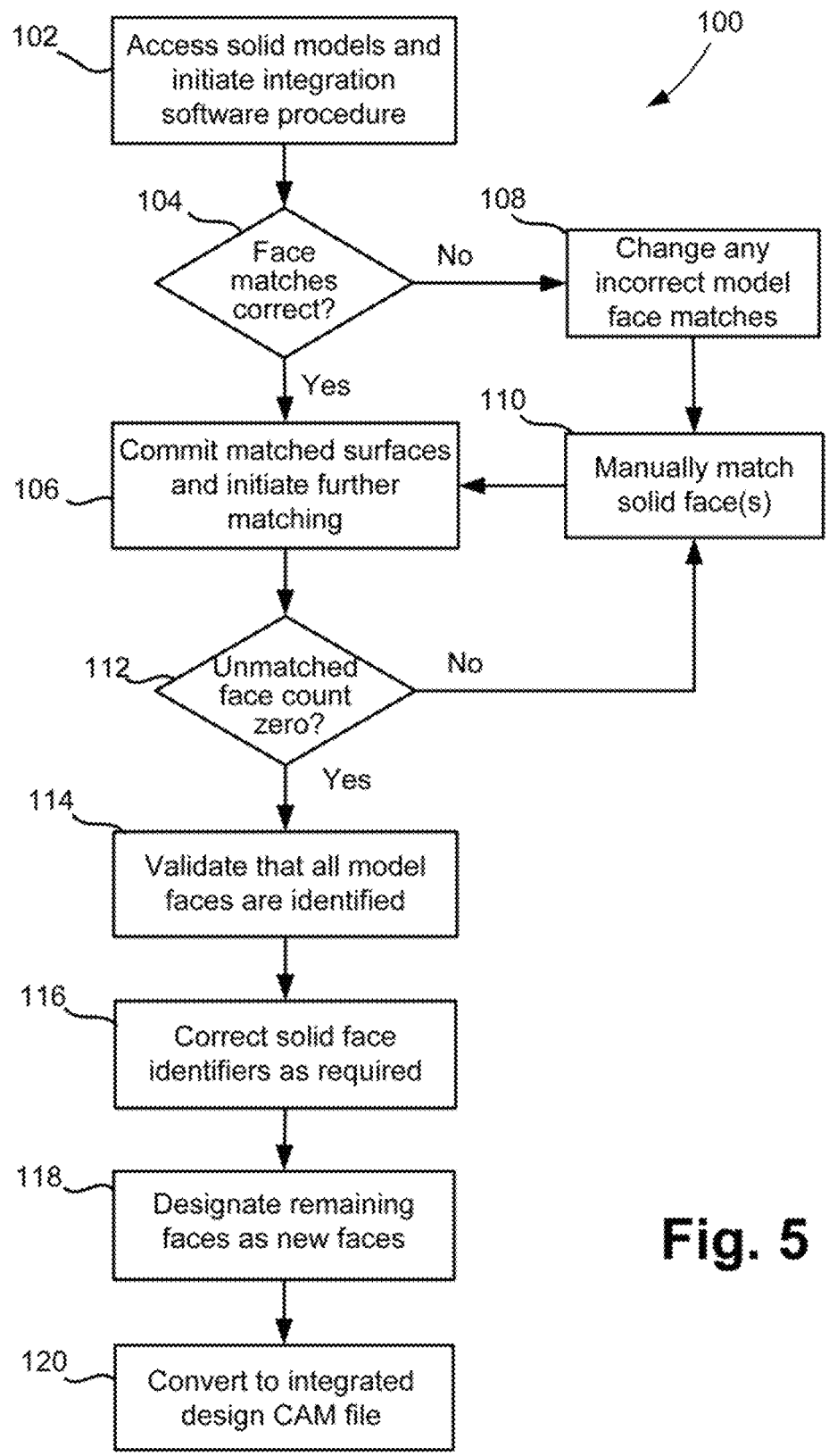
FIG. 5 is a flow diagram illustrating a process of matching component faces in the client component part of FIG. 4 with component faces of the original component part in FIG. 3.

There is shown in FIG. 3 an original solid model 70 corresponding to the receiving format CAD file 14. FIG. 4 shows a client solid model 80 corresponding to the client receiving format CAD file 44. The process of recognizing the engineering changes made to the original solid model 70 to produce the client solid model 80 can be described with reference to a flow diagram 100 in FIG. 5. The DCV software program 62 accesses the receiving format CAD file 14 and the client receiving format CAD file 44, and begins an initial comparison of the respective component faces, at step 102. A physical display (not shown) may be provided so as to enable the user to compare the original solid model 70 side-by-side with the client solid model 80. In the example shown, the DCV software program 62 has indicated that component faces 72, 74, and 76 correspond to component faces 82, 84, and 86 respectively.

The user of the DCV software program 62 is asked to determine, at decision block 104, whether one or more of the indicated face matches are correct matches. If the indicated component faces are correct matches, as in FIGS. 3 and 4, the indicated faces are committed (i.e., verified), and the process moves to step 106 where the DCV software program 62 is instructed to automatically initiate further matching. If the user identifies an incorrect match in the updated display, at decision block 104, the error can be corrected by the user, at step 108. If the DCV software program 62 has not identified any correct matches, the user can continue the process by manually matching one or more component faces in FIG. 4 with corresponding faces in FIG. 3, at step 110.

In the exemplary two-step process, a list of candidate component faces is fetched in the current version of the manufactured part, based on proximity to a point on the component face in the previous version of the manufactured part. It is acceptable if the candidate list contains a few extra candidates, but the list should include the actual match, presuming that one exists. The list of candidate component faces is sequentially evaluated to determine if there is an exact or precise match. If a component face from the current version of the manufactured part, such as the client solid model 80, has the same vertices as that from the previous version of the manufactured part, such as the original solid model 70, we have a match. Since we're comparing only a short list of component faces, the tests to support these comparisons can be quite complex without impacting performance.

The matching process works the same as for exact matches, but in some embodiments the techniques are configured to apply the edit (tentatively) to each component face before confirming if there is a match based on design intent. In some embodiments, the techniques herein can guess at the match between a previous and current component face. For example, if the techniques only matched faces, the risk of an incorrect guess would present a serious and perhaps prohibitive problem. Therefore, the techniques can provide the user with a means to track all non-exact matches back to specific design edits and ultimately an engineering change order. This reconciliation is valuable because upon completion, the guesses made by the matching process then become confident matches.

Matching from topology is the design intent that a feature in a CAD design is the same feature across different revisions. This attribute may be established based on the determination that a specific feature has the same relationship to other features that have previously been established as matched The disclosed process may be referred to as "matching from topology." As some of the component face matches are identified, other face matches can be inferred with a good measure of certainty based on adjacent correct face matches. Referring again to FIGS. 3 and 4, because the component faces 82, 84, and 86 have been committed as correct matches to respective component faces 72, 74, and 76, a component face 88 is considered to be a very likely match to a component face 78. That is, confirmed matches found by reconciling confirmed matches and the topology in each model may be used to identify other probable matches.

Boundary representation models are described in two parts: topology and geometry (surfaces, curves and points). The main topological items are: faces, edges, and vertices. A face is a bounded portion of a surface; an edge is a bounded piece of a curve and a vertex lies at a point. Other elements are the shell (i.e., a set of connected faces), the loop (i.e., a circuit of edges bounding a face) and loop-edge links (also known as winged edge links or half-edges) which are used to create the edge circuits. The edges are like the edges of a table, bounding a surface portion. This is also referred to as a "bRep" entity or a "dumb solid."

The central challenge addressed by the DCV software program 62 is to recognize the precise design changes applied to a solid model without relying on format specific identifiers on the bRep entities. Exact component face matches are defined as matches between two component faces where the designer would consider the faces to be exactly the same. However, the actual implementation in the solid model data may not be exactly the same. For example, the edges and vertices might be listed in a different order or there may be numerical differences resulting from floating point precision.

Change recognition can capture the precise design changes between the two solid models. The difference can be applied as a change vector (e.g., added) to any other solid model whose identifiers use the same namespace. Vector addition can be useful, for example, because this method can allow two engineers to independently edit the same solid model, and then merge their work. Although collisions may occur, just as when merging documents, vector addition allows sustained integration to be viewed as vector addition without getting bogged down in the concept of identifiers.

The DCV software program 62 thus functions to automatically commit high-probability component face matches so that these confirmed matches can be used to recognize other component face matches that may be less probable. In an exemplary embodiment, the DCV software program 62 looks at one or more of: (i) hole attributes (radius and depth), (ii) orientation of component surfaces, (iii) current confirmed edits, and/or (iv) collection item order to make still better suggestions of which component faces should be matched. Once all entities present in both component versions are matched, and the added or deleted entities are identified, the identifiers (names) for each persistent entity is preferably stabilized. This allows any application referring to those identifiers to have a stable reference for each entity. These stabilized names/identifiers are the virtual persistent identifiers.

Step 106 of the flow chart 100 includes: (i) directing the DCV software program 62 to "Auto Propose" matches, (ii) manually querying component face matches, (iii) adding specific matches, and/or (iv) canceling specific matches.

Once all component faces identified in the original solid model 70 and in the client solid model 80 have been matched, at decision block 112, any remaining component faces are marked as additions or deletions. The physical display may show a count of unmatched component faces and, when the unmatched count reaches zero, the DCV software program 62 may validate that all faces have been identified, at step 114.

When all the component faces in the client solid model 80 have been identified, the user can correct the virtual persistent identifiers for any component faces in the client solid model 80 to produce the integrated receiving format CAD file 64, at step 116. The manufacturer NC software program 26 can then be used to convert the integrated receiving format CAD file 64 to the integrated design CAM file 66, at step 118.

Figure 6:
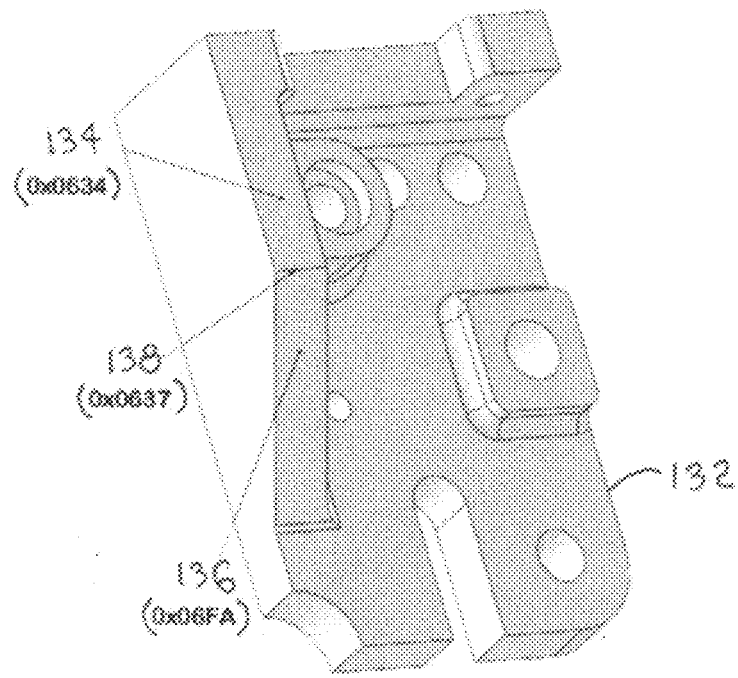
FIG. 6 is an isometric view of the machined part of FIG. 3 labeled with identifiers for selected features.
Figure 7:
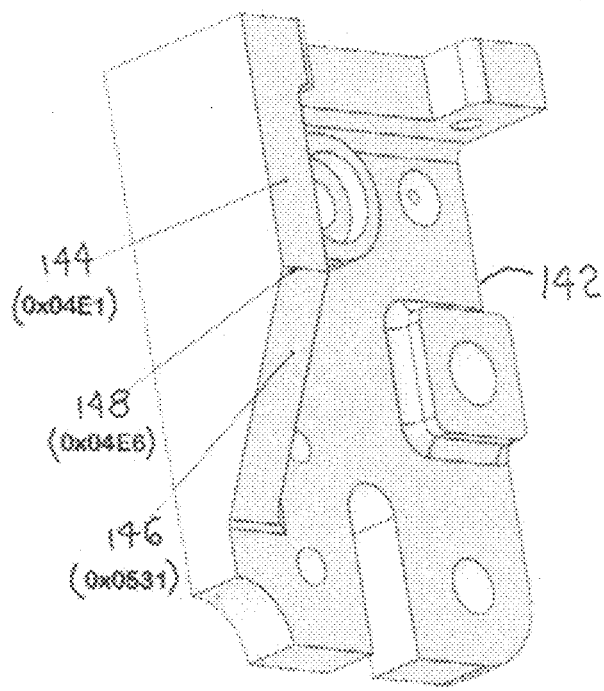
FIG. 7 is an isometric view of the machined part of FIG. 4 labeled with identifiers for selected features.

The DCV software program 62 functions to match component edges from matched component faces. Once all component faces have been matched, or identified as an added face or as a deleted face, the respective component edges can also be matched. An exemplary case is shown in FIGS. 6 and 7. The user of the DCV software program 62 can view via a screen display both an original solid model 132 shown in FIG. 6, and a modified solid model 142 shown in FIG. 6. It has been determined, in this example, that a first component face 134 (denoted as 0×0634) in the original solid model 132 matches a first component face 144 (denoted as 0×04E1) in the modified solid model 142, and that a second component face 136 (denoted as 0×06FA) matches a second component face 146 (denoted as 0×0531).

In a simplified navigation of the original solid model 132, the identification method may start from the first component face 134 (0×0634) and examine all adjoining faces. One of those adjoining faces is second component face 136 (0×06FA). The matching face is the second component face 146 (0×0531). When the technique examines all the adjoining faces for the second component face 146 (0×0531), one of those faces is the first component face 144 (0×04E1) which is matched with the first component face 134 (0×0634), the component face from which the simplified navigation began. The DCV software program 62 accordingly determines that an edge 138 (denoted as 0x0637) on the original solid model 132 matches an edge 148 (denoted as 0x04E6) in the modified solid model 142.

Problem cases may exist. Two component faces might be joined by more than one edge. Or, a blend might have been added between two component faces that were previously joined. The navigation for this processing can be very similar to that for topology driven matching and blend handling. One alternative embodiment is to interactively match edges, and then compute the resulting face matches.

Multiple loops can define a face. A component face is typically viewed as being defined by the bordering edges, but there is an intermediate construct that can be used instead—loops. Two component faces might be geometrically identical but the loops may be defined in different orders. The DCV software program 62 reconciles the loop order between the current and previous versions of the solid model. The remap is stored as an array. Searching can be implemented as a simple sequential search within the face's loop collection, where there are seldom more than ten edges. In other examples where performance becomes an issue, a soft datacube can be used instead. A tubesheet, for example, (used in designing heat exchangers) can be used to test this case.

For cases where a user can easily modify the CAD model, change recognition often needs to be able to recognize that change even more easily. In that context, blends (i.e., fillets, rounding, chamfers) may require special attention. A blend change that is not recognized as a blend, may instead appear as a massive trauma on the solid model that is otherwise difficult to explain. An added blend deletes a sharp edge and replaces it with four others. The topology connections between various faces change. This is the same for a deleted blend.

If the blends surrounding a face change size, every point defining the face probably changes location. The solid modeling kernel can include algorithms for recognizing what faces are blends, so change recognition algorithms can be configured to reconcile them with the matching algorithms. A common blend face has four edges, two edges are the split from the original unblended edge. Those are usually separated by two other edges that typically border another blend face. These blends complicate the process used for matching from topology, as described below.

Figure 8:
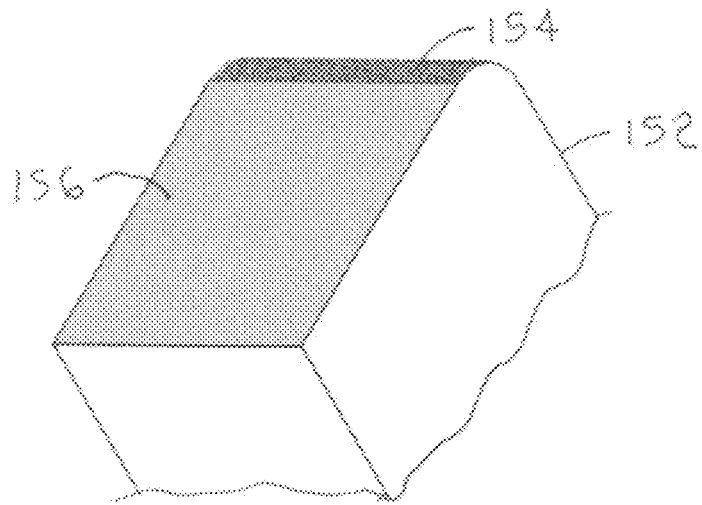
FIG. 8 is an isometric view of an original machined part.
Figure 9:
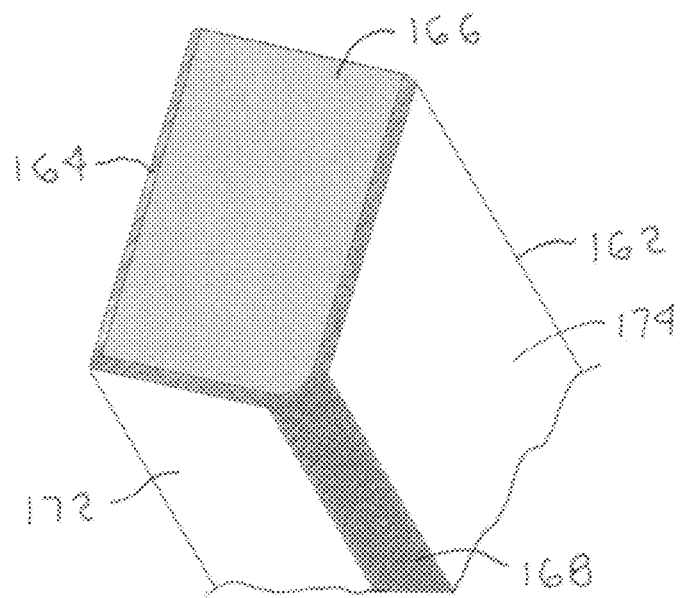
FIG. 9 is an isometric view of the original machined part of FIG. 8 with changes made to selected edges.

Changes are illustrated as differing from an original component design 152, shown in FIG. 8, and a revised component design 162, in FIG. 9: A blend 154 in the original component design 152 has been deleted in the revised component design 162. A blend 164 has been added along the perimeter of a top face 166 of the revised component design 162. A second blend 168 has also been added to the revised component design 162. All the non-blend faces (e.g., top and four sides) are automatically matched by the DCV software program 62. The topological matching process looked beyond the second blend 168 to find adjacent matching faces 172, 174 as if the second blend 168 were not present. The top face 166 is worth particular note. Every edge and every geometric coordinate of the original component design 152 was subject to significant change, yet the match of the top face 166 of the revised component design 162 with a top face 156 in the original design 152 is still automatically recognized.

Use of soft sparse array: When examining a component face from the previous version and searching for the matching component face in the current version, a variety of features interact to assure that only a few faces in the current version need to be processed in detail. Those features greatly narrow the list of faces in the current version that need to be carefully compared, substantially improving processing time. The use of a soft sparse array (where cells are oversized/overlapped to account for data precision issues vs. a conventional a sparse array) provides a significant advantage in processing time.

Regarding parallel change vectors, hints may be extracted from a variety of sources to more efficiently recognize changes between previous and current versions. An additional feature applies matching from topology to the example of using matched faces to match edges or the reverse to match faces from matched edges. Another feature applies matching from topology to the example blended or filleted edges.

In the following sections there are three exemplary options for how to implement virtual persistent identifiers: (i) remap, (ii) indirection, and (iii) redirection. The examples can link parts of a solid model to identifiers used by downstream software applications that need to reference parts of that model. Any one or more of these options can be applied once the techniques establish that the design intent is that a face, edge, or vertex is the same. Remap builds a table that maps identifiers on an import of a later revision to the identifiers on the original. This can be done by either the sending software or change recognition. Indirection is similar to remapping but it builds the conversion table on the receiving side. Redirection actually changes the identifiers instead of building a reference table.

If two values lie within a predefined accuracy, denoted as "epsilon" the values are presumed to be the same. Epsilon is taken to correspond to a linear distance and may vary for different designs. Epsilon is used as the amount by which cells in the soft sparse array are over-sized. Small instruments might use, for example, one micron for epsilon. In ship design, epsilon might be 0.1 millimeter or larger.

Saving to a file can be an xml-based method, for example, and the files stored in such a way that pointer references may be restored A match record refers to two face entities that match, one from the previous and one from current model. The match record can also hold references to various edits that reconcile the two faces.

In the process of searching for component faces, essentially all the faces in a current solid model are compared for a match. Thus, a design comprising seventy component faces might require about 2415 comparison steps. A design comprising 3000 faces might require about 4.5 million comparisons, roughly proportional to the number of faces squared, or an "n-squared search." A "soft datacube" can be used in an indexing process to address the computational requirement of the n-squared search. A simple sorted search along one axis should reduce the number of comparisons, but it would still be proportional to n-squared, and thus scalability would still be an issue.

A datacube search can be used to deal with the n-squared issue. In an exemplary embodiment, the DCV software program 62 may implement as a three-dimensional sparse-array, where the points defining every face in a solid model are mapped to an array element corresponding to a small xyz region. Such arrays can easily become too large for a computer's memory. The sparse array approach avoids that problem. Further, different CAD systems may have a slight variability in how they define the location for various elements, so points may appear in an adjacent exact cell versus where they are expected.

Alternatively, the DCV software program 62 may use a "hard datacube" method, which can require checking multiple cells. While the hard datacube method may be a less efficient approach, it may be an adequate alternative. The datacube can be used to "index" the faces in the current model, the previous model, or both.

Sparse arrays are a specific type of array that mitigate memory problems by allowing empty cells to lack memory. The sparse array used by the DCV software program 62 can be up to 65,000×65,000,×65,000. A simple (i.e., hard) datacube might have difficulty when considering points near the border of a cell. The border points might correspond to a matching point in an adjacent cell. Points within epsilon of a cell corner would have to be tested in seven other cells. The disclosed method can implement a soft datacube to avoid this testing. Each xyz cell is oversize by epsilon in each direction. The oversize/overlap means some points might be referenced by more than one cell, but for any search only one cell needs to be checked.

The cells within a datacube aren't required to be evenly spaced. Non-uniform spacing could further improve performance. This could be particularly useful when a design has a large cluster of points in a few small regions of the design. By placing cell boundaries in void areas, the oversize cells may not be required. Fewer points would be needed in each cell. This avoids problems with high density cluster of small faces.

A loop is an ordered collection of edges (possibly just one edge) that closes upon itself, ending where it started. Two loops might be geometrically identical but might start/end at different edges within the ordered collection. This is important to ensure that the name of each entity in a loop is stable. The rotation between two loops may be stored as an array of integers with one entry of the array for each loop that defines a face. Just as with loops, some of this processing uses sequential search. If performance becomes an issue, the techniques can instead use a soft datacube.

Some integration methods may require only that the solution match the faces. There can be advantages to also recognizing edits: Reconciling the detail edits with design intent can assure the quality of the engineering process. The techniques are not just communicating with computer applications, but can also be configured to communicate with people that may like to see the edits organized in a sensible way. Once the edits are cleanly organized there should be very few unknown edits, which can be a strong indicator that the matches are all correct. Entities subject to the same edit can be grouped and assigned to a specific engineering change order. These can be listed and highlighted various colors for visual reference.

The DCV software program 62 may include various edit types. In an "add/delete" edit, this is a trivial case because information has already been captured in the match data: Add may be inferred when the match date refers to no previous entity. Delete may be inferred when the match data refers to no current entity.

An attribute change is another trivial case, such as a change in the radius of a component feature. Translation is an edit which moves a component face or feature by an x,y,z offset. Transform is a translate step with a rotate step. There are times when a single match, such as matching a hole for example, doesn't capture enough information to recognize the correct transform. The transform may become apparent only when seen as having been applied to several faces.

Surface transforms can be useful with mixed-edit, since a component face might be stretched by a transform that applies only to a single edge or vertex. Mixed-edits refer to matches that may affect only certain edges or vertices, and not others. An example of this case is a change that includes a stretching operation. When an entity type is modified, the change may have been unintended, but such changes do occur. A change recognition procedure captures such modifications. This action can be useful in automating repairs to subsequent revisions of a solid model. Unknown edits are edits that the DCV software program 62 functions to minimize, because the process of reconciling unknown edits is not reliable. Unknown edits may be caused by manual interaction or from topology driven matching.

Conventional software applications have typically been written without incorporating design change vectors. Some new applications may include some new integration interfaces to use design change vector data. Some conventional software applications, for example, may discard or ignore identifiers upon importing data from a foreign format. Before change recognition was implemented, this often made sense since the identifiers were unstable. However, successful integration with a target application often requires recovering that information. For example, using the target application API, the techniques can populate the same bRep model as is used by other parts of this solution. That bRep model uses whatever identifier scheme is supported by the target application. Since a just populated bRep should be an exact match to a Parasolid file that was imported for use by this solution, change recognition finds all the matches automatically, since all the matches are exact in this case.

When a component face features a hole, the hole being defined as two circles bounding a single cylindrical surface, there may be some possible problems. For example, a hole has no vertices. The edge defining the circle has no begin/end point, which may present a problem to a method that functions to compare vertices. In such situations, the DCV software program 62 can function to use the center of the circle for comparison. Alternatively, the circle can be modeled as a 360 degree arc with an arbitrary start/end point. These start/end points are, however, often poor candidates for finding matches, so the method may default to follow a procedure of recognizing a circle via the circle center.

When a hole intersects another component face that is not planar, or is disposed at a non-square angle, the technique may need to process a large amount of geometry data that isn't very useful for identify matches. To address this, the geometric center of the holes edge can be used as an equivalent to a circle center.

Feature and product manufacturing information (FPMI) data features and PMI may be a typical downstream application, but with the additional consideration that some applications integrate directly to the FPMI data instead of the bRep model. Sustained integration support for FPMI integration targets assure that the identifiers for the features and PMI items have persistent identifiers. FPMI data defines additional relationships between geometric entities. Those relationships can be used to further automate match recognition, much the same way as does topology.

Change recognition quality indicators comprise a number, or a small set of numbers, that indicate how much risk there might be of an erroneous match. Change recognition quality indicators relate to unknown edits, adjacent unknown edits, adds, and deletes.

Regarding parallel change vectors, creating a change vector without entity identifiers will often involve cases that require some manual interaction. On the system creating the edits, those identifiers are stable and persistent, so it is preferable to create the change vector on the source system. Identifiers that do not transfer reliably across the export/ import boundary to the match data created on a source system are often not as useful, but the edit data can be very useful. On the receiving side of the export/import boundary, the techniques are configured to use edits from original change vector data as hints for recognizing changes on the receiving side. This functions to increase the automatic recognition on the receiving side.

As stated above, the identifiers for each persistent entity is stabilized once all entities present in both solid model versions are matched and the added or deleted entities are identified. These stabilized identifiers are virtual persistent identifiers. The DCV software program 62 provides for at least three options of implementing virtual persistent identifiers. These methods can link parts of a solid model to identifiers used by downstream software applications that need to reference parts of the solid model. Any one or more of these options can be applied once the matching techniques described above establish the desired design intent. For example, the design intent may indicate that specified entities, faces, edges, and/or vertices, in a modified design are the same as in the original design.

Figure 10:
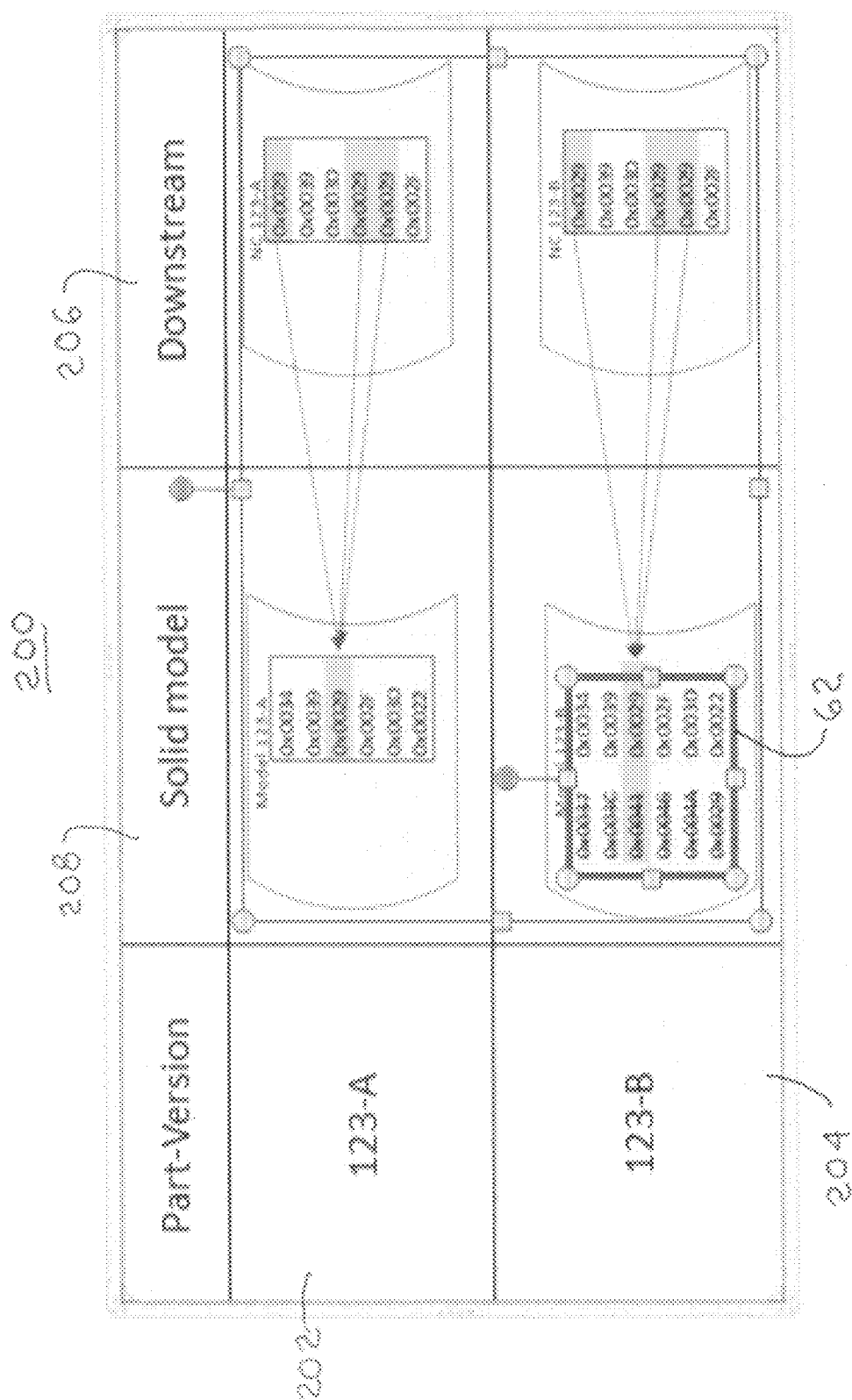
FIG. 10 is a table illustrating a remapping option, in accordance with the present invention.

FIG. 10 provides an example of a remap option. A remap table 200 is built by the DCV software program 62, where identifiers on an import of a later revision component are mapped to the identifiers on the original component. This may be done by either the sending software or by change recognition. In the example shown, a first row 202 for an original component 123-A represents a data table of entity names in the original solid model after being imported into the receiving format CAD file 14, shown in FIG. 2. A bottom row 204 is for a client-revised component 123-B after being imported into the client receiving format CAD file 44, shown in FIG. 2. A rightmost column 206 with the heading "Downstream" shows data tables used in some integrated engineering application (e.g., assemblies, manufacturing simulations, etc.) and refer to entity names on the solid models. When the component 123-B is imported, the revised component 123-B does not initially have the same identifiers as the original component 123-A did after import. In the 123-B row 204, in a Solid Model column 208, the identifiers assigned by the translator are changed via the DCV software program 62 to remap the identifiers to the same identifiers as used on part 123-A.

Figure 11:
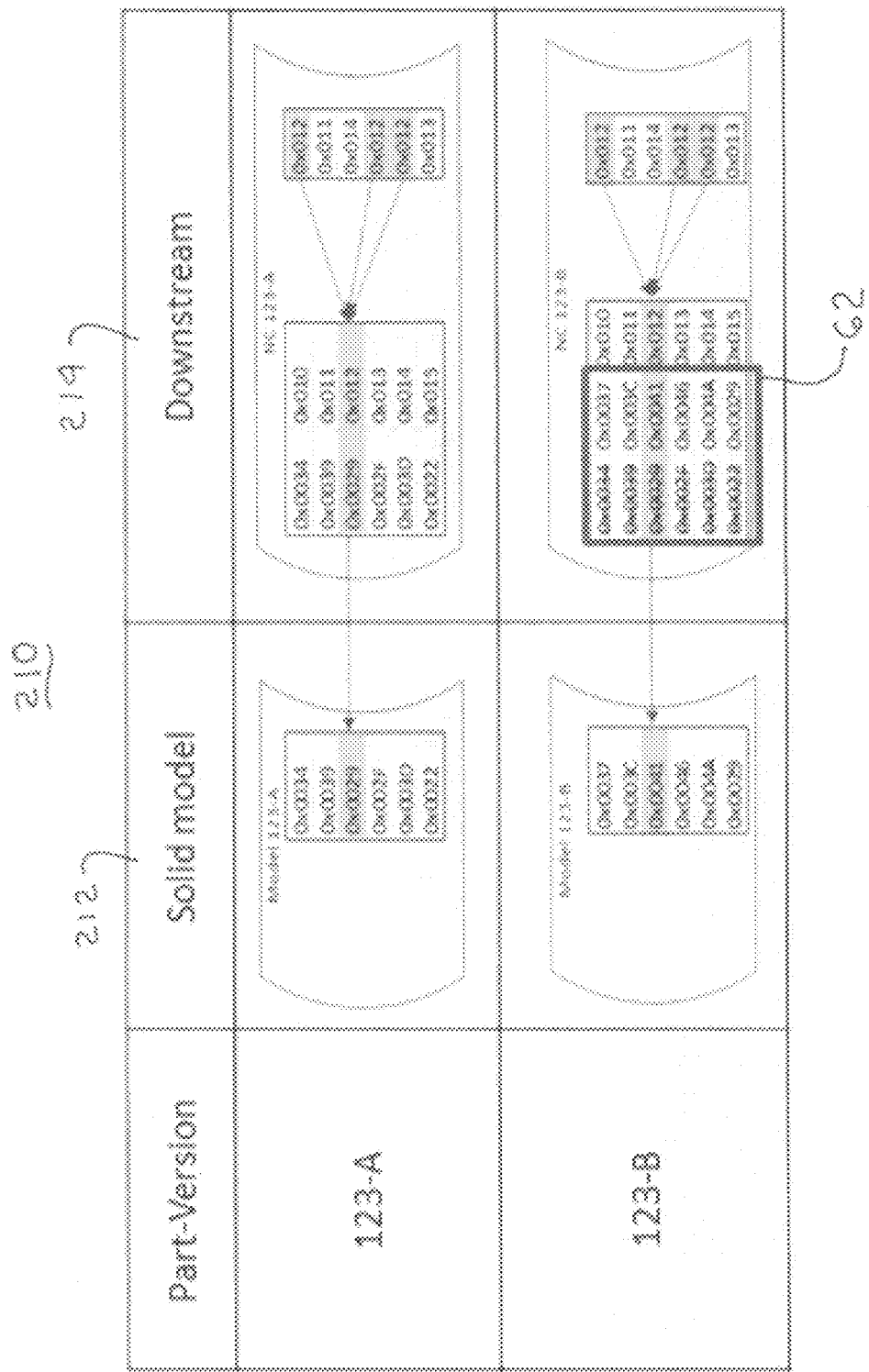
FIG. 11 is a table illustrating an indirection option, in accordance with the present invention.

FIG. 11 provides an example of an indirection option. Indirection serves the same purpose as the remapping process described above, but indirection builds a conversion table 210 between the solid model and the receiving application. This is often useful if no interface is available to edit the names on the actual solid model. In this case the original solid model 123-A has an entity identified as 0×0029 on the model, shown in a solid model column 212. The DCV software program 62 modifies the conversion table 210 to associate this entity identifier to the entity identified as 0×012, shown in a downstream column 214, by the integrated engineering application referencing that model. When part 123-B is received, with newly assigned identifiers, the conversion table 210 is used to associate identifier 0×012 from the downstream application to the new name of the same entity.

Figure 12:
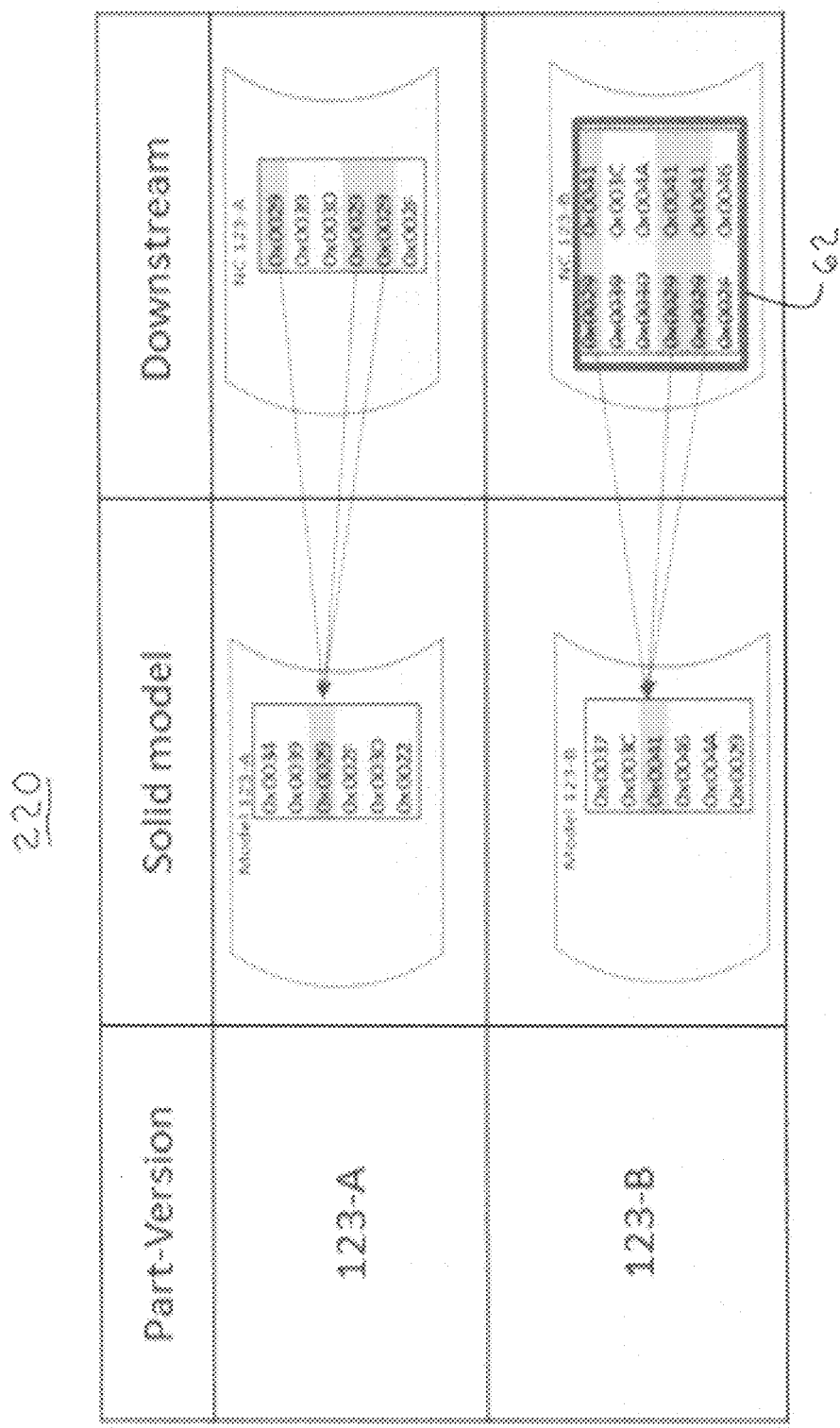
FIG. 12 is a table illustrating a redirection option, in accordance with the present invention.

FIG. 12 provides an example of a redirection option as displayed in a conversion table 220. The DCV software program 62 may utilize a redirection method to ensure a stable reference from the "downstream" integrated engineering application that references the solid component model to each entity. This approach actually changes the identifiers used by the downstream application instead of building a reference table between the solid model and the downstream application.

The software integration solution described herein can be implemented in digital electronic circuitry, or in computer software, firmware, or hardware, including the structural means disclosed in this specification and structural equivalents thereof, or in combinations. The software integration solution described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data.

Finally, it is to be understood that the disclosed subject matter is not limited in its application to Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A method of integrating changes to a computer aided manufacturing software application file for a manufactured component, said method comprising the steps of:
obtaining a first computer aided design file comprising a first set of identifiers corresponding to component entities including faces for the manufactured component;
displaying a first solid model of the manufactured component, said first solid model based on said first computer aided design file;
obtaining a second computer aided design file comprising a second set of identifiers corresponding to component entities including faces for a revised version of the manufactured component;
displaying a second solid model of the revised version of the manufactured component, said second solid model based on said second computer aided design file; and
matching at least one face on said second solid model to at least one face on said first solid model;
using a design change vector (DCV) software program to change the second set of identifiers in the second computer aided design file back to identifiers used in the first computer aided design file;
once all faces present in both the first and second solid models are matched, identifying added or deleted entities between the first and second solid models;
stabilizing the identifiers for the matched faces and designating these stabilized identifiers as a set of virtual persistent identifiers;
implementing the set of virtual persistent identifiers by the design change vector (DCV) software program by providing for at least three options that include:

(i) a remap option used to build a remap table using the DCV software program that maps the first set of identifiers to the second set of identifiers, (ii) an indirection option by building a conversion table between the first solid model of the first computer aided design file and a receiving application, and (iii) a redirection option changes the second set of identifiers and does not does build a reference table between the first solid model and an integrated engineering application; and outputting an integrated receiving CAD file by using the virtual persistent identifiers determined and implemented by the design change vector (DCV) software program.

\* \* \* \* \*